Sept. 27, 1949.  C. E. DOLBERG  2,483,187
PULSE RADIO ECHO DISTANCE INDICATOR
Filed Aug. 30, 1944
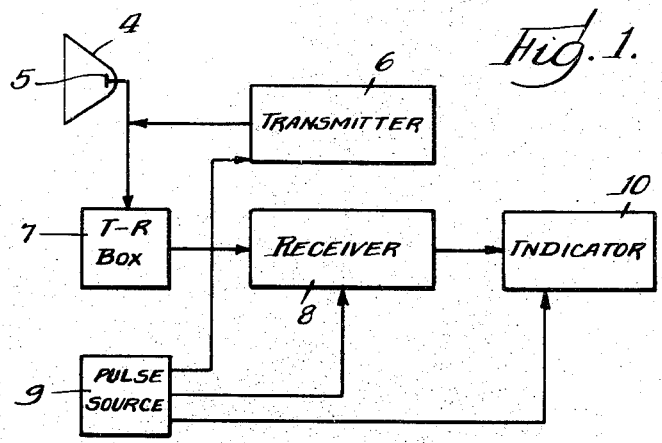
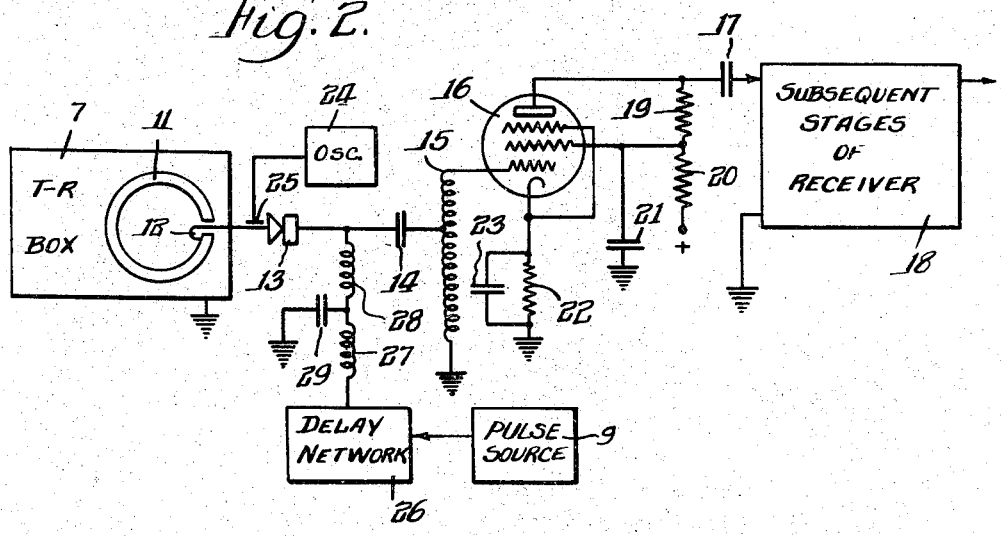
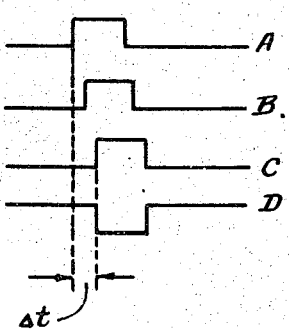
INVENTOR.
Charles E. Dolberg
BY
Howson & Howson
attys.

Patented Sept. 27, 1949

2,483,187

UNITED STATES PATENT OFFICE 2,483,187

PULSE RADIO ECHO DISTANCE INDICATOR

Charles E. Dolberg, Philadelphia, Pa., assignor, by mesne assignments, to Philco Corporation, Philadelphia, Pa., a corporation of Pennsylvania Application August 30, 1944, Serial No. 551,953

3 Claims. (Cl. 343—13)

The present invention relates to ultra high frequency receiving systems and more particularly to an arrangement for minimizing shock excitation of the amplifier of a receiver by pulses generated by a transmitter.

In ultra high frequency radio detecting and ranging equipment (radar) it is customary to transmit time spaced pulses in the form of a series of high frequency pulse signals, to receive the same pulses upon reflection from distant objects. Means are provided at the radar station for measuring and indicating the elapsed time between transmission of a pulse and the reception of the reflected pulse. Such systems generally utilize a single antenna structure for transmission and reception, and the receiver is coupled to the antenna through a device commonly termed a transmit-receive box, abbreviated T-R box. While the T-R box is provided so that the transmitter energy is kept out of the receiver circuit, a small portion of the modulated radio frequency energy of the transmitter leaks through the T-R box and reaches the receiver. The high intensity of the transmitted pulse often produces a strong transient in certain of the receiver circuits and these transients persist for an appreciable time after the termination of a pulse. In long range radar systems this effect is not regarded as serious since the objects sought after are at very considerable distances from the station so that by the time that the reflected pulse reaches the receiver, the receiver has returned to stability. For the shorter range operation, however, it is necessary to provide some arrangement for obviating this undesirable effect.

It therefore would be desirable to eliminate this effect upon the receiver and accordingly the present invention provides an arrangement whereby a delayed neutralizing voltage opposite in phase and of substantially equal amplitude to the unwanted video pulse is applied to neutralize the effect on the grid of the first stage of intermediate frequency amplification of the receiver.

Other and further objects of the present invention subsequently will become apparent by reference to the following description taken in connection with the accompanying drawing wherein Figure 1 is a block diagram representation of a communication system having a receiver operated in accordance with the present invention;

Figure 2 is a circuit diagram of a portion of the receiver of Figure 1 showing the embodiment of the present invention; and Figure 3 is a graphical representation to illustrate the operation of the circuit shown in Figure 2.

In the block diagram of Figure 1 there is shown a system having an ultra high frequency energy radiator 4 which may be of the parabolic reflector type having a dipole 5 at the focal point. A transmitter 6 is connected to feed energy to the radiator. The radiator also serves as a receiving antenna and is connected through a T-R box 7 to a receiver 8. The T-R box 7 is a device having the function of decoupling the receiver 8 from the antenna 5 during the pulse transmission period of the transmitter 6, and to decouple the transmitter 6 from the antenna during the intervening periods. Such a device is described by W. E. Moulic in an article entitled "Operational elements of a radio system," in the May 1945 issue of "Electronic Industries," page 76 et seq., and especially page 79, Fig. 9. The transmitter 6 which generates ultra high frequency energy is connected to receive energy from a pulse source 9 which modulates the transmitter energy with pulses often referred to as video pulses. The receiver 8 is coupled to a suitable indicator 10 which may comprise an oscilloscope with its associated control operating circuits which may be controlled from the pulse source 9.

In a typical radar system the transmitter 6 and the pulse source 9 combine to produce a signal having pulses, which may, for example, be of one microsecond duration occurring at the rate of a thousand per second. These signals may be radiated from the antenna structure 5. Upon reflection from a distant object the returning pulses are received by the same antenna and supplied through the T-R box 7 to the receiver 8. The indicator 10 connected to the receiver is responsive both to the pulse from the pulse source 9 and to the reflected pulse which is received by the receiver 8, and is constructed and arranged in a known manner, to provide a reading or indication by means of which an observer is enabled to determine the distance between the transmitter and the reflecting object. The time interval between the transmission of the pulse from the transmitter and the reception of the reflected pulse is proportional to the distance between the radar station and the reflecting object.

While the T-R box 7 is effective to a considerable degree to decouple the receiver 8 from the antenna during the pulse transmission period, it does not entirely prevent the receiver and indicator from being deleteriously affected by the transmitted signal energy, and consequently it is necessary to provide additional means to prevent shock excitation of the tuned circuits of the receiver. This is accomplished in accordance with the present invention with an arrangement shown in greater detail in Figure 2 which shows a portion of the receiver 8 and its relation to the T-R box 7 and the pulse source 9.

In Figure 2 the device 11 represents part of the transmit-receive box 7. The device 11 may be provided with a coupling loop or probe 12 which is connected to a conductor to supply ultra high frequency energy to a microwave detector 13 which generally is in the form of a crystal detector. The detector 13 is coupled through a capacitor 14 to an intermediate point on a grid circuit inductor 15. The grid circuit inductor 15 is connected between ground and the control grid of the multielement vacuum tube 16 arranged in the first stage of intermediate frequency amplification of a radio receiver. The anode of the vacuum tube 16 is coupled through a capacitor 17 to the subsequent stages, indicated by the rectangle 18, of the radio receiver 8. The anode of the vacuum tube is connected to suitable resistors 19 and 20 which in turn are connected to a suitable source of anode potential. The intermediate point between the resistors 19 and 20 is by-passed to ground by a capacitor 21, and one of the grids of the vacuum tube is also connected to the common juncture of these resistors. A suppressor grid is connected to the cathode which in turn is provided with a bias resistor 22 and a parallel by-pass capacitor 23 connected to ground. The receiver has a suitable local oscillator 24 capacitively coupled at 25 to the input to the microwave detector 13 so that signals are supplied to the intermediate frequency amplifier at the intermediate frequency. During the transmitting period of the transmitter 6, a small portion of the R. F. signal leaks through the T-R box 7. This signal is detected by the detector 13 and is supplied to the input of the following amplifier. The aforesaid signal includes both an intermediate frequency component and a video pulse voltage component. This latter voltage is of such magnitude as to produce shock excitation of the tuned circuits of the radio receiver which is undesirable.

In order to obviate the shock excitation of the radio receiver a portion of the energy supplied by the pulse source 9 is fed to a time delaying network 26 which is of a type which may be adjusted to control the length of the time delay and also the magnitude of the energy supplied by the delay network to the associated circuit elements. This delay network may be of any one of a number of types, including a variable length delay line, or a pulse delay multivibrator. A device of the latter type is described in paragraph 143 of "Radar Engineering" by Donald G. Fink, published by McGraw-Hill Company in 1947, and also in U. S. Patent No. 2,402,916, issued June 25, 1946, to A. C. Schroeder. A device of the same type is described and claimed in the copending application of R. C. Moore, Serial No. 533,385, filed April 29, 1944, now Patent No. 2,479,954 issued August 23, 1949. The delay network is necessary in order to provide the required time delay of the pulse without affecting its shape. The delay network is connected to the microwave detector 13 through a plurality of series inductors or chokes 27 and 28, the common juncture of which is by-passed to ground by a capacitor 29.

In the graphical representation of Figure 3, the curve A represents the pulse supplied to the transmitter 6 and the curve B represents the modulated radio frequency envelope of the energy transmitted by the transmitter. The curve C represents the unwanted video pulse appearing in the output of the microwave crystal detector 13. In opposition to the pulse represented by the curve C there is supplied in accordance with the present invention a negative or opposite phase pulse represented by the curve D. It will be noted from the representation in Figure 3 that there is a time delay of $\Delta t$ between the beginning of the pulse in curve A and the beginning of the pulse in curve C. The delay network 26 is adjusted to provide this time increment $\Delta t$ without distortion of the shape of the pulse. The magnitude of the pulse supplied by the curve D is adjusted so as to substantially neutralize the effect of the pulse of curve C, and hence at the output of the microwave detector 13 there does not appear any appreciable voltage which might be supplied to the control grid of the first intermediate frequency stage vacuum tube 16. Accordingly there is no shock excitation of the tuned circuits associated with the remainder of the radio receiver.

While for the purpose of describing and illustrating the present invention certain circuit arrangements have been shown as applied to one type of ultra high frequency communication systems, it is to be understood that such modifications and variations are contemplated both in the circuit arrangement and in the system in which employed as may be commensurate with the spirit and scope of the invention as set forth in the appended claims.

This invention is hereby claimed as follows:

1. In a radio ranging system, a transmitter, a source of control pulses connected to said transmitter to effect transmission of pulse-modulated high-frequency signals, a receiver for receiving said pulse-modulated signals upon reflection thereof by some object, said receiver being prone to receive said pulse-modulated signals directly from the transmitter, said receiver including a frequency converter stage constructed and arranged to convert said pulse-modulated high-frequency signals to pulse-modulated intermediate-frequency signals, said frequency converter stage generating also spurious video frequency pulse signals in response to the said direct reception of pulse-modulated high-frequency signals, means for deriving pulses from said source, means for modifying the latter pulses so that they are coincident with and of the same magnitude as said spurious pulse signals but of opposite phase, and means for combining the modified pulses with said spurious pulse signals substantially to cancel out the latter.

2. In a radio ranging system, a transmitter, a source of control pulses connected to said transmitter to effect transmission of pulse-modulated high-frequency signals, a receiver for receiving said pulse-modulated signals upon reflection thereof by some object, said receiver being prone to receive said pulse-modulated signals directly from the transmitter, said receiver including a frequency converter stage constructed and arranged to convert said pulse-modulated high-frequency signals to pulse-modulated intermediate-frequency signals, said frequency converter stage generating also spurious video frequency pulse signals in response to the said direct reception of pulse-modulated high-frequency signals, means for deriving pulses from said source, means for modifying the latter pulses so that they are coincident with and of the same magnitude as said spurious pulse signals but of opposite phase, and means for combining the modified pulses with said spurious pulse signals in said frequency converter stage substantially to cancel out the spurious pulse signals.

3. A radio ranging system according to claim 2, wherein the means for modifying the derived pulses comprises a time delay network.

CHARLES E. DOLBERG.

REFERENCES CITED

The following references are of record in the file of this patent:

UNITED STATES PATENTS

| Number | Name | Date |
| --- | --- | --- |
| 2,055,883 | Terry | Sept. 29, 1936 |
| 2,208,422 | Hugon | July 16, 1940 |
| 2,227,057 | Blumlein | Dec. 21, 1940 |
| 2,310,692 | Hansell | Feb. 9, 1943 |
| 2,371,988 | Granqvist | Mar. 20, 1945 |
| 2,403,527 | Hershberger | July 9, 1946 |
| 2,406,316 | Blumlein et al. | Aug. 27, 1946 |
| 2,421,340 | Levy | May 27, 1947 |